United States Patent [19]

Krause

[11] 4,424,622
[45] Jan. 10, 1984

[54] METHOD OF MAKING INTEGRAL CORROSION RESISTANT MANIFOLD

[76] Inventor: Peter E. F. Krause, R.R. #1, Limehouse, Ontario, Canada

[21] Appl. No.: 399,729

[22] Filed: Jul. 19, 1982

[30] Foreign Application Priority Data

Jul. 15, 1982 [CA] Canada ................................. 407360

[51] Int. Cl.³ .............................................. H05B 3/00
[52] U.S. Cl. ........................................ 29/611; 29/460; 29/527.3; 165/65; 165/108; 219/421; 425/566; 425/568
[58] Field of Search ...................... 29/460, 611, 527.3; 425/566, 565, 568; 219/421, 535; 164/61, 65, 112, 91, 108

[56] References Cited
U.S. PATENT DOCUMENTS

| | | | |
|---|---|---|---|
| 1,617,489 | 2/1927 | Lightfoot | 164/108 X |
| 2,324,533 | 7/1943 | Pearson | 164/108 X |
| 2,834,050 | 5/1958 | Dymsza et al. | 425/565 X |
| 3,095,644 | 7/1963 | Curry | 29/460 X |
| 3,606,401 | 9/1971 | Schwarz | 29/460 UX |
| 4,013,393 | 3/1977 | Gellert | 425/566 |
| 4,222,430 | 9/1980 | Lindner | 164/61 |
| 4,238,671 | 12/1980 | Gellert | 219/421 |
| 4,279,588 | 7/1981 | Gellert | 425/568 |
| 4,286,941 | 9/1981 | Gellert | 425/566 |
| 4,355,460 | 10/1982 | Gellert | 29/611 |

Primary Examiner—Charlie T. Moon
Attorney, Agent, or Firm—Riches, McKenzie & Herbert

[57] ABSTRACT

This invention relates to an improved integral manifold for a sprue gated multi-cavity injection molding system and a method of manufacturing the same. The manifold has an inner body portion which fits into a hollow retaining ring portion to define a circular peripheral space between them. The inner body portion is formed of a corrosion and abrasion resistant material such as stainless steel and has a number of straight melt ducts extending through it from a common inlet to spaced outlets each leading to a central bore in separate heated nozzles. The peripheral space contains an electric heating element surrounded by a highly conductive material such as copper. The manifold is manufactured by assembling the retaining ring portion on the inner body portion with the heating element in the space between them. A filler tube is located on the retaining ring portion in alignment with a filler duct therethrough and all the joints are sealed by brazing the assembly in a vacuum furnace. A copper slug is then inserted into the filler tube and the assembly is again heated in a vacuum furnace to cast the copper into the peripheral space around the heating element. This provides an integral unit with an improved combination of the characteristics of corrosion and abrasion resistance and thermal conductivity, as well as straight melt ducts which facilitate cleaning.

10 Claims, 4 Drawing Figures

METHOD OF MAKING INTEGRAL CORROSION RESISTANT MANIFOLD

BACKGROUND OF THE INVENTION

This invention relates to a sprue gated multi-cavity injection molding system and more particularly to an integral electrically heated manifold and a method of manufacturing the same.

In the past, injection molding systems have been well known which have manifold plates with several arms through which melt passages branch outwardly from a common inlet to convey melt to a number of cavities. An example of this type of structure is shown in U.S. Pat. No. 4,013,393 entitled "Valve-Gated Injection Molding Mechanism" which issued Mar. 22, 1977 to Gellert. It is, of course necessary that the temperature of the hot melt be maintained within a certain range as it flows through the manifold plate. If the temperature of the melt becomes too high it will partially decompose, and if it becomes too low it will become too viscous. A number of systems are accordingly known for providing heat to the manifold plates and recent improvements in this regard are shown in Gellert Canadian patent application Nos. 393,671 and 400,058. Application No. 393,671 which was filed Jan. 6, 1982 and entitled "Injection Molding Manifold Member and Method of Manufacture" discloses casting copper around a heating element in a channel in the manifold plate formed of H13 steel. Application No. 400,058 which was filed Mar. 13, 1982 entitled "Heater Installation in Molding Members" describes a method of integrally casting a cartridge heater into an H13 steel manifold plate.

While both of these structures provide improvements in heat transfer and even temperature control, the constant expansion of the application of injection molding to more and more difficult to mold materials has made abrasion and corrosion resistance as well as temperature control even more critical. Furthermore, a deterioration in the quality of available molding materials has resulted in existing systems being more susceptible to corrosion which, on occasion, results in their no longer being acceptable for existing applications. Therefore, for certain corrosive or abrasive materials, it is necessary that the melt passage extend completely along its length through a corrosion and abrasion resistant material such as stainless steel. However, this must be combined with the provision of very reliable temperature control to maintain the melt within the narrow critical range.

More recently, it has become desirable to provide an improved manifold for a relatively straight forward sprue gated multi-cavity system which has a small number of heated nozzles or sprue bushings of the type disclosed in U.S. Pat. No. 4,238,671 entitled "Sprue Bushing with Cast In Heater Element" which issued Dec. 9, 1980 to Gellert. Improved nozzles of this type are also shown in Gellert U.S. C-I-P application Ser. No. 234,641 which was filed on Feb. 17, 1981, now U.S. Pat. No. 4,355,460, issued Oct. 26, 1982 entitled "Sprue Bushing and Method of Manufacture" and Gellert U.S. patent application Ser. No. 285,260 which was filed July 20, 1981, now U.S. Pat. No. 4,403,405, issued Sept. 13, 1983 entitled "Sprue Bushing Connector Assembly and Method". In addition to having this improved combination of characteristics, it is desirable that the manifold for such a system be relatively economical to manufacture. Furthermore, it is a considerable economical advantage to overcome the disadvantage of these previous manifold plates that the melt passages are relatively difficult to clean out if the system malfunctions and the melt decomposes or solidifies in them.

SUMMARY OF THE INVENTION

Accordingly, it is an object of the invention to at least partially overcome these problems by providing an improved manifold for a multi-cavity sprue gated system which an improved combination of the characteristics of abrasion and corrosion resistance and thermal conductivity as well as an economical method of manufacturing it.

To this end, in one of its aspects, the invention provides an electrically heated integral manifold for a multi-cavity sprue gated injection molding system with a plurality of heated nozzles each having a bore through which a melt passage extends to a respective gate, the manifold comprising an inner body portion formed of an abrasion and corrosion resistant material, the inner body portion having a corresponding number of melt ducts, each extending therethrough from a common inlet to an outlet in alignment with the bore of a respective nozzle; a retaining ring portion having a central opening therethrough to receive the inner body portion whereby a space is defined between the inner body portion and the retaining ring portion, the space extending around the periphery of the inner body portion; an electrical heating element extending around the inner body in said peripheral space with terminal means extending therefrom; and a highly conductive portion cast around the heating element to fill said peripheral space and provide the manifold with an integral construction.

In another of its aspects, the invention further provides a method of manufacturing an electrically heated injection molding manifold having an inner body portion with a plurality of melt ducts extending therethrough seated in a hollow retaining ring portion defining a peripheral space therebetween which receives an electrical heating element surrounded by a highly conductive material, comprising the steps of forming the inner body portion of a suitable abrasion and corrosion resistant material with a plurality of melt ducts extending from a common inlet to separate outlets; forming the hollow retaining ring portion with a central opening adapted to receive the inner body portion to define a peripheral space therebetween; assembling the retaining ring portion on the inner body portion with the heating element located in the peripheral space formed therebetween; and vacuum casting a highly conductive material into the peripheral space thereby surrounding the heating element and providing the manifold with an integral construction.

Further objects and advantages of the invention will appear from the following description taken together with the accompanying drawings.

DESCRIPTION OF THE PREFERRED EMBODIMENTS

Figure 1:
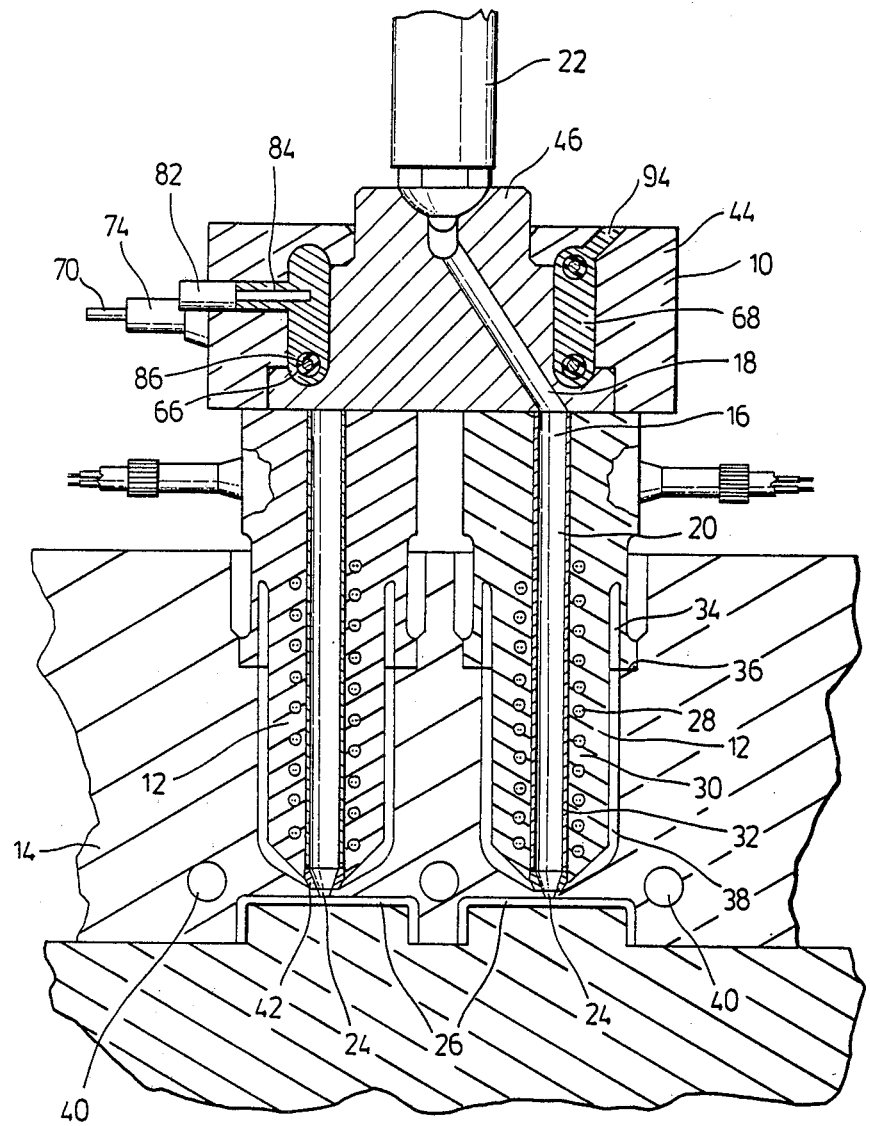
FIG. 1 is a sectional view showing a multi-cavity sprue gated system with a manifold according to a preferred embodiment of the invention.

Reference is first made of FIG. 1 which shows a portion of a multi-cavity sprue gated injection molding system having a manifold 10 according to the invention. The system includes a pair of heated nozzles or sprue bushings 12 seated in a cavity plate 14. Two melt passages 16 extend through melt ducts 18 in the manifold 10 and which are in alignment with respective central bores 20 in the nozzles 12. The melt passages 16 convey pressurized melt from the molding machine 22 to the gates 24 in the cavity plate 14 through which it flows into the respective cavities 26.

Each nozzle 12 is heated by a helical electrically heating element 28 which is cast in a conductive copper portion 30 around a stainless steel inner portion 32 through which the central bore 20 extends. Each nozzle 12 has an insulation bushing portion 34 which is seated on a shoulder 36 of the cavity plate 14 to provide an insulative air gap or space 38 between the hot nozzle 10 and the cavity plate 14 which is cooled by cooling channels 40. The air gap 38 is bridged by nozzle seals 42, each of which is seated in a respective nozzle 12 in alignment with the central bore and abuts against the cavity plate 14 around the gate 24. The nozzle seals 42 are formed of a titanium alloy and act to prevent leakage of the pressurized melt into the air gap 38 and to transfer additional heat from the nozzles 12 as described in U.S. Pat. No. 4,043,740 entitled "Injection Molding Nozzle Seal" which issued Sept. 2, 1977 to Gellert.

The manifold 10 has a retaining ring portion 44 and an inner body portion 46 with an outer surface 48 shaped to be received in the assembled position in a generally circular shaped central opening 50 through the retaining ring portion 44. The retaining ring portion 44 has an inner surface 52 which is shaped with the outer surface 48 of the inner body portion to form a generally circular shaped space 54 which extends between them around the periphery of the inner body portion in the assembled position. As may be seen, both the retaining ring portion 44 and the inner body portion 46 have a flanged portion 56,58 which abuts against a respective shoulder 60,62 on the other portion on opposite sides of the peripheral space 54. The manifold 10 has an electrical heating element 64 with coils 66 which are cast in a highly conductive portion 68 in the peripheral space 54 and a pair of cold terminals 70 which extend from terminal openings 72 in the retaining ring portion. The electric heating element 64 extends through collars 74 which are seated in each of the terminal openings 72. The inner body portion 46 has a pair of melt ducts 18 which extend diagonally outward therethrough from a common inlet 76 to separate outlets 78. The inlet 76 is recessed to receive the molding machine 22 and the outlets 78 are in alignment with the central bores 20 of the nozzles 12.

As may be seen in FIG. 1, the retaining ring also has a thermocouple hole 80 extending through it between the terminal openings 72. The thermocouple hole 80 has a plug 82 in it and a thermocouple well 84 will be drilled through the plug 82 and into the highly conductive portion 68 adjacent the heating element 64. The thermocouple hole 80 is slightly above and offset between the terminal openings 72 to avoid hitting the heating element coil 66 when drilling the thermocouple well 84 into the highly conductive portion 68. The inner body portion 46 is formed of a material which is resistant to corrosion and abrasion from the pressurized melt flowing through the melt ducts 18 and in the preferred embodiment is made of stainless steel. The conductive portion 68 in which the heating element coils 66 are cast is sufficiently thermal conductive to quickly remove heat from the coils 66 and transfer it to the outer surface 48 of the inner body portion 46 and in the preferred embodiment is copper. In addition to being more efficient, this reduces problems with the heating coil burning out and applies the heat more uniformly along the melt ducts 18. In this embodiment, the retaining ring portion 44 is formed of H13 steel and the coils 66 of the electrical heating element 64 are formed with a central resistance wire 86 which is attached to the cold terminal 70, both of which are surrounded by a compacted refractory powder 88 such as magnesium oxide in a pliable metal sheath 90 formed of a mterial such as Inconel.

In use, the sytem is assembled as described above and electrical power is applied to all of the heating elements to heat up the manifold 10 and the nozzles 12 to a predetermined temperature. Pressurized melt is then introducted into the melt passages 16 from the molding machine 22 and a controlled operating cycle is commenced. The melt flows through the melt passages 16 when pressure is applied and the pressure is released when the cavities are full. Following a short cooling period, the mold is opened for ejection and then closed again and the cycle is repeated in a conventional manner. The hot pressurized melt passes through the melt ducts 18 in the manifold 10 and then through the aligned central bores 20 of the nozzles 12 where it is continually in contact only with stainless steel which is resistant to its corrosive and abrasive effects. At the same time, there is a relatively even application of heat along the length of the melt passages 16 from the heating elements 28,64. If the melt passages 16 do become clogged as a result of a material such as polyvinyl chloride getting outside the critical temperature range, the system must be disassembled and the melt passages cleaned out. In the case of the manifold melt ducts 18 which extend in a straight line from the inlet 76 to the outlet 78, this may be done relatively easily by drilling them when compared to previous manifold plates having melt passages which are bent.

Figure 2:
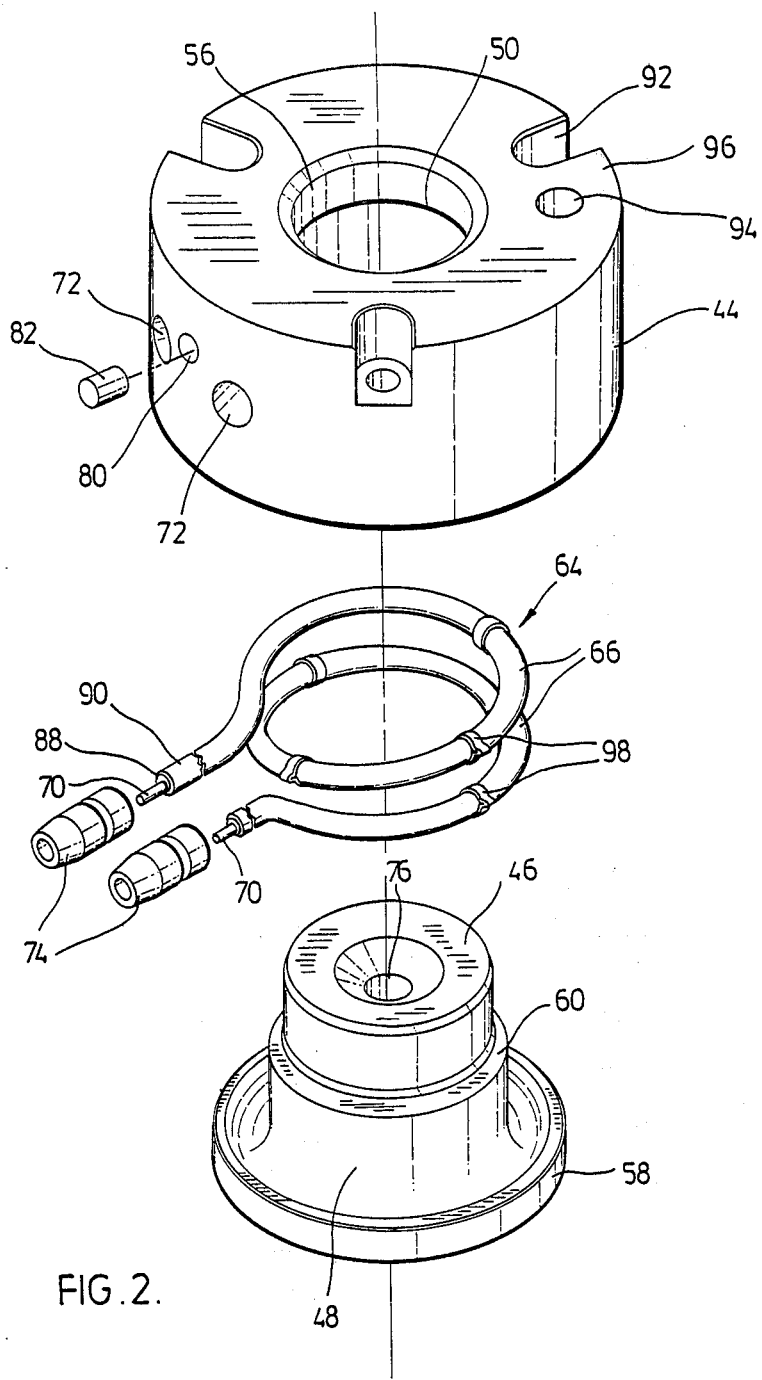
FIG. 2 is an exploded isometric view of the components of the manifold seen in FIG. 1.
Figure 3:
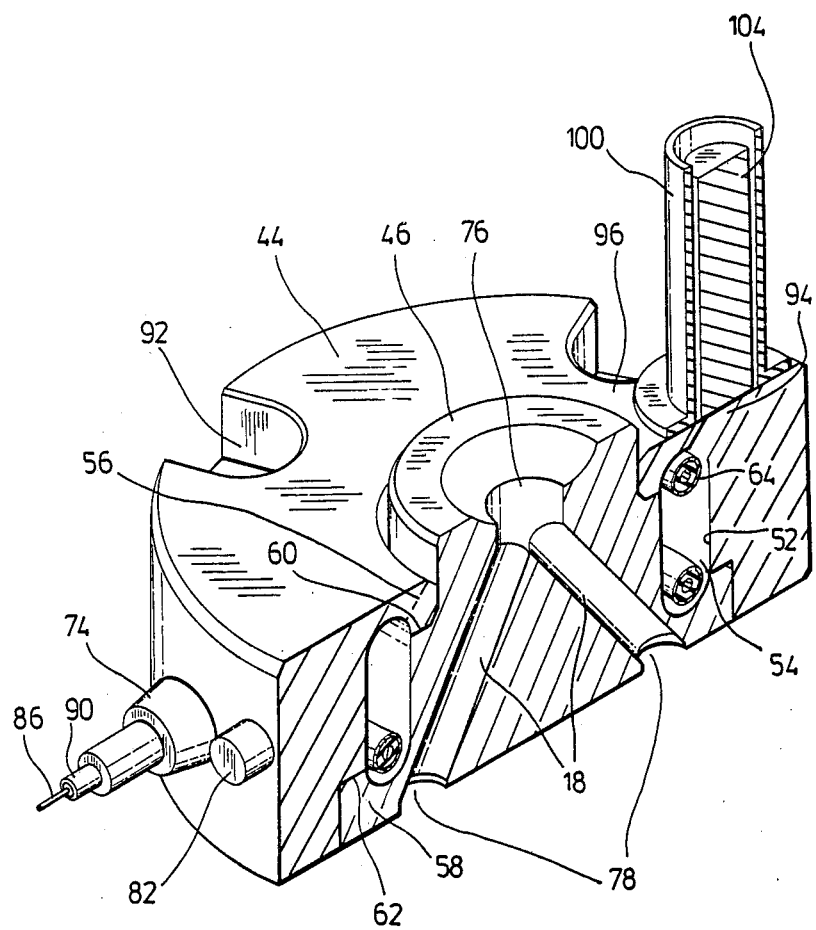
FIG. 3 is a sectional view of the assembled components showing a step in the method of manufacture according to a preferred embodiment of the invention.
Figure 4:
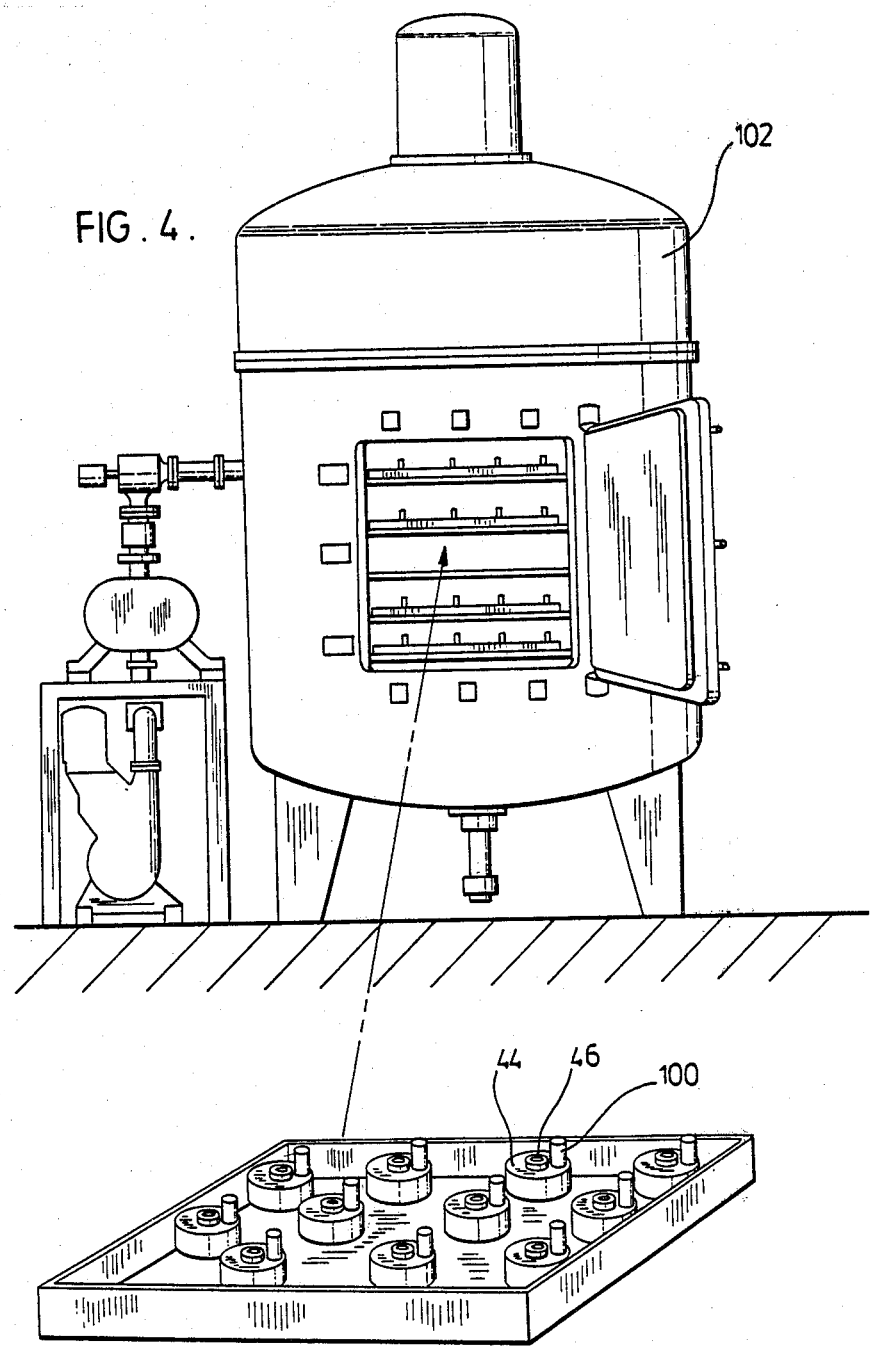
FIG. 4 shows a batch of assembled manifolds ready for insertion into a vacuum furnace.

A method of manufacturing the manifold according to a preferred embodiment will now be described with reference to FIGS. 2-4. The retaining ring portion 44 and the inner body portion 46 are machined and drilled as seen in FIG. 2. The inner body portion 46 is machined to have an outer surface 48 with a flanged portion 58 and a shoulder 60. It is drilled to form the straight melt ducts 18 extending from the common recessed inlet 76 to the spaced outlets 78. The retaining ring portion 44 is similarly machined to have an inner surface 52 with a flanged portion 56 and a shoulder 62, as well as bolt head recesses 92. It is drilled to provide the radially extending heating element terminal openings 72 and the thermocouple hole 80. The retaining ring portion 44 is also drilled to form a filler duct 94 extending from its upper surface 96 into the peripheral space 54.

The coiled electric heating element 64 is inserted into the retaining ring portion 44 with the cold terminals 70 projecting through the terminal openings 72. The retaining ring portion 44 with the heating element 64 is then located on the inner body portion 46 which extends through the central opening 50 in the retaining ring portion 44. In this assembled position, the flanged portion 56 of the retaining ring portion 44 abuts against the shoulder 60 of the inner body portion 46 and the flanged portion 58 of the inner body portion 46 abuts against the shoulder 62 of the retaining ring portion 44. The outer surface 48 of the inner body portion 46 and the inner surface 52 of the retaining ring portion 44 define the generally circular shaped peripheral space 54 between them. The coiled heating element 64 has a number of spacer clips 98 crimped around its outer sheath 90. These spacer clips 98 are fully described in Gellert U.S. patent application Ser. No. 334,154 which was filed Dec. 24, 1981 entitled "Spacer Clip for Injection Molding Heater" and act to space the heating element from the adjacent surfaces. The collars 74 are then slid over the heating element terminals 70 into the terminal openings 72 to seal them against leakage, and the thermocouple plug 82 is similarly inserted into the thermocouple hole 80.

Following assembly, a hollow cylindrical filler tube 100 is placed in an upright position on the upper surface 96 of the retaining ring portion 44. As may be seen in FIG. 3, the filler tube 100 is in alignment with the filler duct 94 which extends into the peripheral space 54. A nickel brazing paste is then applied around the base of the filler tube 100 as well as along the joints between the inner body portion 46 and the retaining ring portion 44 and also around the terminal collars 74 and the thermocouple plug 82. The assembled manifold 10 is then heated in batches in a vacuum furnace 102. This causes the nickel brazing compound which melts about 2180° F., to run all along the joints and braze them to fix the filler tube 100 in position and seal the other joints against leakage. A slug 104 of a predetermined amount of copper is then inserted into the filler tube 100 as shown in FIG. 3 and the assemblies are then reinserted into the vacuum furnace in an upright position as shown in FIG. 4. They are heated until to a temperature of about 1950° F. in the case of copper which will melt the copper slug 104, but not the nickel brazing. The temperature is held unitl the copper runs down through the filler duct 94 and completely fills the peripheral space 54 surrounding the heating element coils 66. Casting the copper under a partial vacuum has the effect of very closely bonding or fusing it to both the heating element coils 66 and the surrounding surfaces 48 and 52. As described above, this improves heat flow away from the heating element 64 and to the inner body portion 46 and substantially eliminates the possibility of heating element burnout due to "hot spots" caused as a result of insulative air gaps. After the manifolds 10 have been removed from the vacuum furnace and cooled, the filler tubes 100 are machined off. A thermocouple well 84 is then drilled through the thermocouple plug 82 into the highly conductive portion 68 adjacent the heating element coils 66. The thermocouple plug 82 is formed of a material, such as a soft stainless steel which is easier to drill through than the retaining ring portion 44.

While the description of the manifold 10 and the method of making it have been given with respect to preferred embodiments, it is not to be construed in a limiting sense. Variations and modifications will occur to those skilled in the art. For instance, the components may be made of different shapes than those described and of different materials having suitable characteristics. Additional melt ducts 18 may be drilled through the inner body portion 46 for use with a larger number of nozzles 12 leading to more cavities 26. Reference is made to the appended claims for a definition of the invention.

What I claim is:

1. A method of manufacturing an electrically heated injection molding manifold having an inner body portion with a plurality of melt ducts extending therethrough seated in a hollow retaining ring portion defining a peripheral space therebetween which receives an electrical heating element surrounded by a highly conductive material, comprising the steps of:
(a) forming the inner body portion of a suitable abrasion and corrosion resistant material with a plurality of melt ducts extending from a common inlet to separate outlets;
(b) forming the hollow retaining ring portion with a central opening adapted to receive the inner body portion to define a peripheral space therebetween;
(c) assembling the retaining ring portion on the inner body portion with the heating element located in the peripheral space formed therebetween and spaced from said ring portion and said inner body portion; and
(d) vacuum casting a highly thermally conductive material into the peripheral space thereby surrounding the heating element and providing the manifold with an integral construction.

2. A method as claimed in claim 1 wherein the heating element has terminal means and at least one terminal opening is provided through the retaining ring portion, the heating element being located in the retaining ring with the terminal means inserted through said at least one opening before the retaining ring portion is assembled on the inner body portion.

3. A method as claimed in claim 2 wherein step (b) includes drilling a filler duct through the retaining ring portion from an upper surface to connect to the peripheral space following assembly, and step (d) is carried out by casting the highly conductive material into the peripheral space through the filler duct.

4. A method as claimed in claim 3 including the step following assembly of substantially sealing the peripheral space against leakage of the highly conductive material during casting.

5. A method as claimed in claim 4 wherein step (d) includes fixing an open ended filler tube to the upper surface of the retaining ring portion around the upper end of the filler duct, inserting a predetermined quantity of highly conductive material into the filler tube, and heating the assembly in a vacuum furnace to melt the conductive material which flows down through the duct to fill the peripheral space around the heating element, and further including machining off the filler tube after removal from the vacuum furnace.

6. A method as claimed in claim 5 wherein the sealing and casting steps include locating the filler tube on the upper surface of the retaining ring portion around the upper end of said duct, applying brazing material around the joint between it and the upper surface as well as along the joints between the retaining ring portion, and the inner body portion and brazing the assembly in a vacuum furnace to fix the filler tube in position and seal the peripheral space against leakage during casting.

7. A method as claimed in claim 6 wherein said peripheral space formed between the inner body portion and the retaining ring portion is generally circular shaped and the heating element is formed with a plurality of coils.

8. A method as claimed in claim 1 wherein the melt ducts are drilled straight through the inner body portion to extend diagonally outward from the central inlet to the circumferentially spaced outlets.

9. A method as claimed in claim 4 further including the steps of drilling a thermocouple hole to extend through the retaining ring portion into said peripheral space, inserting a plug into at least a portion of the hole to prevent leakage during casting, and after casting drilling a thermocouple receiving well through the plug into the highly conductive material abjacent the heating element, the plug being formed of a material which is softer than the retaining ring portion.

10. A method as claimed in claim 3, 4 or 5 wherein the inner body portion is formed of stainleess steel and the highly conductive material is copper.

* * * * *